United States Patent Office 3,442,928
Patented May 6, 1969

---

3,442,928
PREPARATION OF N-(BETA-DIALKYLDITHIO-PHOSPHORYLETHYL)ALKYL CARBAMATES AND THIOCARBAMATES
Raymond A. Simone, Walnut Creek, Calif., assignor to Stauffer Chemical Company, New York, N.Y., a corporation of Delaware
No Drawing. Filed Nov. 19, 1965, Ser. No. 508,844
Int. Cl. C07f 9/16
U.S. Cl. 260—455                12 Claims

ABSTRACT OF THE DISCLOSURE

Process for the preparation of N-(beta-dialkyldithiophosphorylethyl)alkyl carbamates and thiolcarbamates comprising reacting an appropriate alkyl chloroformate or thiolformate with ethylenimine in the presence of a hydrogen chloride acceptor and then condensing the alkyl aziridinyl formate or thiolformate with a dialkyl dithiophosphoric acid or dialkyldithiophosphate alkali metal or ammonium salt.

---

This invention relates to an improved process involving new and novel reactions for the preparation of N-(beta-dialkyldithiophosphorylethyl)alkyl carbamates and thiolcarbamates. In particular, this invention refers to an improved process for preparing N-(beta-dialkyldithiophosphorylethyl)alkyl carbamates and thiolcarbamates which comprises (1) reacting the appropriate alkyl chloroformate or thiolformate with ethylenimine in the presence of a hydrogen chloride acceptor and (2) condensing the alkyl aziridinyl formate or thiolformate with a dialkyl dithiophosphoric acid or dialkyldithiophosphate alkali metal or ammonium salt.

The carbamate and thiolcarbamate phosphates produced herein are valuable compounds. They find significant utility as insecticides and acaricides.

The current known methods of preparation of the carbamates and thiolcarbamates of the present invention involve complex batchwise operations. In general, 2-haloethylamine, usually the bromide or chloride, was condensed with the requisite alkyl chloroformate or chlorothiolformate in the presence of hydrogen halide acceptors. The alkyl-N-2-haloethyl carbamate or thiolcarbamate thus prepared was condensed further with a dialkyldithiophosphate salt. Such factors in processing as the order of addition of reactants, necessity of dehydration between steps, and the concentration of reactants all influence the ultimate quality and quantity of the final product. Other methods of preparation which use more reactive intermediates, but are largely prohibited due to economic considerations, may be proposed.

A general object of the present invention is, therefore, to provide a new and improved process for preparing N - (beta-dialkyldithiophosphorylethyl)alkyl carbamates and thiolcarbamates.

More specifically, an object of the invention is provision of a process for preparing said phosphorus-containing carbamates and thiolcarbamates in a rapid and economical manner by new and novel reaction schemes capable of producing substantially increased yields of said compounds.

Pursuant to the above-mentioned and yet further objects, it has been found that N-(beta-dialkyldithiophosphorylethyl)alkyl carbamates and thiolcarbamates can be prepared by reacting an alkyl chloroformate or alkyl chlorothiolformate with ethylenimine in the presence of an aqueous caustic solution, followed by the reaction of the alkyl aziridinyl formate formed thereby with a dialkyl dithiophosphoric acid or dialkyldithiophosphate alkali metal or ammonium salt. The reactions can be represented by the following equations:

(1)
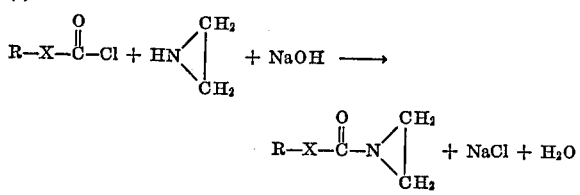

(2)
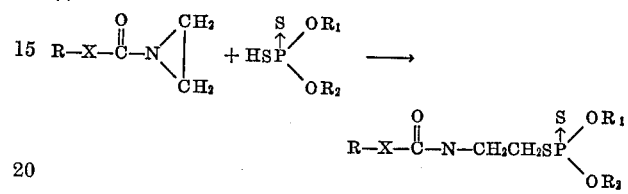

wherein R, $R_1$ and $R_2$ are lower alkyl radicals containing from 1 to 6 carbon atoms, inclusive, and X is an oxygen or sulfur. In place of the free dithiophosphoryl acid the alkali metal or ammonium salt may be used. In such a case, the reaction opening the alkylaziridinyl formate ring requires the presence of an aqueous media.

Broadly considered, the nature of the alkyl substituent attached to the oxygen atoms of the aziridinyl formate or the sulfur of aziridinyl thiolformate may be of any carbon content and substitution to be included within the scope of the invention. It is only necessary that the compounds used be stable in the presence of the solvents and reagents employed and at the temperatures at which the reactions are carried out. Similarly, the aziridinyl formate or aziridinyl thiolformate may be substituted with an aryl group, such as phenyl, halophenyl, lower alkyl phenyl, naphthyl and the like.

The phosphorus-containing carbamates and thiolcarbamates, whose preparation is described in the present invention, most conveniently may be prepared in accordance with the above equations. The reaction of Equation 1 represents the reaction of a chloroformate or chlorothiolformate with ethylenimine. The ratio in which the reactants are used in the reaction of Equation 1 is not critical but for maximum yield it is perferred that for each mole of chloroformate or chlorothiolformate there is used an equivalent mole of ethylenimine and a mole of acid acceptor. Although the reaction will occur at almost any mole ratio of reactants, an excess of ethylenimine will result in competing reactions. The competing reactions in turn will result in undesirable by-products and thus lowers the ultimate yield and quality of the final product. Slight excesses of ethylenimine, 2 to 5 percent, or of the alkyl chloroformate or chlorothiolformate, 2 to 5 percent, will have little or no effect on the quality.

H. Bestian, Annalen, 566, 229 (1950), shows the reaction of ethyl chloroformate with ethylenimine in the presence of triethylamine. However, the yield obtainable using this particular acid acceptor is only about 60 to 65 percent of the ethyl aziridinyl formate. It has been found surprisingly and unexpectedly that when aqueous sodium hydroxide is used as the acid acceptor, yields of the alkyl aziridinyl formate are generally greater than 90 percent. Therefore in the preferred embodiment of the instant invention the acid acceptor is aqueous sodium hydroxide.

The use of sodium hydroxide as the acid acceptor also has the distinct advantage over triethylamine, that economically the recovery of the acid acceptor and subsequent regeneration is not required. Reaction (2), supra, may be carried out directly on the crude product therefrom. This latter factor coupled with the improved yields of the intermediate aziridinyl formate clearly points to the preferred use of aqueous sodium hydroxide as an acid acceptor in the reaction.

The temperature at which the initial reaction of the chloroformate or chlorothiolformate and ethylenimine is conducted in the presence of aqueous sodium hydroxide affects the quality of the final product. It is desirable to conduct this phase of the reaction at as low a temperature as possible. The temperature range found most satisfactory is between about $-10°$ C. and about $+25°$ C., although higher temperatures are allowed with a sacrifice of final product quality. The reaction may be conducted as rapidly as possible with the determining factor the rate at which the heat of reaction can be removed.

The ring opening reaction, Equation 2, of the alkyl aziridinyl formate is carried out under acidic conditions. The reaction occurs readily at or below room temperature. The aziridinyl formate is reacted with the requisite dialkyldithiophosphate salt or its free acid. The ring-opening reaction is generally conducted with two phases present. An organic phase, usually benzene or toluene, is employed as a solvent. If a solvent was used in the reaction of Equation 1 then this solvent may be used here as a solvent for the ring opening and condensation. It should be noted that when using aqueous sodium hydroxide as the acid acceptor it is not necessary to isolate the intermediate and separate the acid acceptor therefrom. An aqueous phase is employed as a solvent for introducing the dialkyldithiophosphate salt. When the free acid is used there is no need for an aqueous phase, although a highly polar phase is desirable in this instance. Changes in the solvents employed will ultimately affect the reaction rates much in the same way as they affect equilibria conditions. It should be noted that a variation in solvent systems may not only change the speed of the reaction but also its apparent order. Isolation of the product therefrom can be accomplished by normal means of separating, drying and removal of the organic solvent.

The ratio in which the reactants are used in the aziridinyl ring-opening are not critical although it is preferred to use at least a mole to mole ratio of reactants. Particularly it is preferred to use a slight excess up to about 10 percent of the phosphorus-containing salt or free acid. The temperature of the reaction mass will generally increase upon carrying out the ring-opening reaction due to the heat of reaction.

The reaction is very fast with the criteria for the rate of reaction dependent upon the efficient removal of the excess heat. The reaction will proceed at over a wide temperature range; however, it is preferred to maintain the temperature at about 25° C. where the reaction will proceed at a controllable rate. Broadly considered, temperatures between $-20°$ C. to $+100°$ C. are operable. To complete the process the reaction products are cooled to room temperature and the pH adjusted to near neutral (pH 7-8) before phase separation and subsequent recovery of the N - (beta - dialkyldithiophosphorylethyl)alkyl carbamates and thiolcarbamates.

The condensation of ethylenimine with an alkyl chloroformate or chlorothiolformate in the presence of an aqueous sodium hydroxide as an acid acceptor to yield surprising and unexpected improved yields of the corresponding aziridinyl formate or thiolformate, coupled with the new and novel ring opening of the aziridinyl formate and thiolformate, constitutes an invention resulting in an improved process for the preparation of N-(beta-dialkyldithiophosphorylethyl)alkyl carbamates and thiolcarbamates.

The following non-limiting examples illustrate the process of this invention.

EXAMPLE 1

Preparation of ethyl-N-($\beta$-O,O-dimethyldithiophosphorylethyl)carbamate

Into a glass reactor equipped with a stirring means, a dropping funnel and a thermometer, was added 21.5 g. (0.5 mole) of ethylenimine and 250 ml. of toluene. The reactor contents were cooled to $-5°$ C. and 80 g. of 25 percent aqueous sodium hydroxide solution was added. To the reaction flask was now added 54.2 g. (0.5 mole) of ethylchloroformate over a period of 15 to 30 minutes. The temperature was maintained at $-5°$ C. during the addition of the chloroformate. After the addition was completed the temperature was allowed to rise to 12° C.

The reaction mass was transferred to a dropping funnel and 81 g. (0.51 mole) of purified dimethyldithiophosphoric acid was charged into the original reactor. An additional 50 ml. of toluene solvent was added to the acid. The initial reaction mass, containing the ethyl aziridinyl formate, was added to the dithio acid solution over a 10 minute period. The temperature was kept between 15° and 25° C. The reaction was allowed to stir an additional 15 minutes at 25° C. At this time 100 ml. of water was added and sufficient 25 percent sodium hydroxide to increase the pH to 8. The phases were separated and the organic phase was washed twice with 150 ml. of water. The washed organic phase was stripped of solvent at 1 mm. Hg at 65° C. There was obtained 123.8 g. (90.7 percent of theory based on the initial charge of ethylenimine) of the title compound. The purity of the product was 98 percent as analyzed by gas phase chromatography.

EXAMPLE 2

Preparation of n-propyl-N-($\beta$-O,O-diethyldithiophosphorylethyl)thiolcarbamate In the same manner as Example 1, 69.3 g. (0.5 mole) of n-propylchlorothiolformate was condensed with 2.15 g. (0.5 mole) of ethylenimine in the presence of 80 g. of 25 percent sodium hydroxide solution using 250 ml. of toluene as a solvent.

This reaction product-mixture was added to 100 g. (0.555 mole) of diethyldithiophosphoric acid. This resulted in a 99.5 percent yield of the title compound. The purity as determined by gas phase chromatography was 99 percent.

The following is a table of additional typical compounds conveniently prepared according to the above described examples.

TABLE $$\begin{array}{c} R_1O \\ \diagdown \\ R_2O \end{array} \!\!\! \begin{array}{c} S \\ \uparrow \\ P-S-CH_2CH_2-NHCXR \\ \diagup \end{array} \!\!\! \begin{array}{c} O \\ \| \\ \end{array}$$

| $R_1$ | $R_2$ | R | X | Percent Yield | Percent Purity |
|---|---|---|---|---|---|
| ethyl, | ethyl | ethyl | O | 95 | 97 |
| methyl, | methyl | methyl | O | 88 | 98 |
| ethyl, | ethyl | methyl | O | 89 | 98 |
| i-propyl, | i-propyl | ethyl | S | 93 | 94 |
| ethyl, | ethyl | ethyl | S | 99 | 98 |
| methyl, | methyl | methyl | S | 94 | 93 |

In general the insecticidal and acaricidal activity of the compounds produced by the improved method herein described is greatly enhanced. By employing sodium hydroxide as an acid acceptor and the reaction involving the ring opening of the alkyl aziridinylformate there results an unexpected increase in entomological activity. This enhanced activity is present over the compounds as previously prepared using the multi-step procedure starting with 2-haloethylamines.

I claim:

1. A process for the preparation of alkyl N-(beta-dialkyldithiophosphorylethyl)carbamates and thiolcarbamates in which said alkyl groups contain from 1 to 6 carbon atoms, inclusive, comprising the steps: reacting a member selected from the group consisting of alkyl chloroformate and alkyl chlorothiolformate with ethylenimine in the presence of sodium hydroxide solution and reacting in an acidic solution the alkyl aziridinyl formate or alkyl aziridinyl thiolformate therefrom with a member selected from the group consisting of dialkyldithiophosphoric acid and aqueous solutions of alkali metal and ammonium dialkyldithiophosphates and adjusting the pH to about 7 to about 8 before isolating the material produced thereby.

2. The process as described in claim 1 wherein ethyl chloroformate and ethylenimine are reacted in the presence of a solution of sodium hydroxide and the ethyl aziridinyl formate formed therein is condensed with dimethyldithiophosphoric acid to produce ethyl-N-(beta-O,O-dimethyldithiophosphorylethyl)carbamate.

3. The process as described in claim 1, wherein n-propyl chlorothiolformate and ethylenimine are reacted in the presence of a solution of sodium hydroxide and the n-propyl aziridinyl thiolformate formed therein is condensed with diethyldithiophosphoric acid to produce N - propyl - N - (beta - O,O - diethyldithiophosphorylethyl)thiolcarbamate.

4. The process of opening an alkyl formate or alkyl thiolformate N-substituted ethylenimine ring comprising reacting said N-substituted ethylenimine ring under acidic conditions with a member selected from the group consisting of dialkyldithiophosphoric acid and aqueous solutions of alkali metal and ammonium dialkyldithiophosphates and adjusting the pH to about 7 to about 8 before isolating the material produced thereby.

5. The process as described in claim 4 wherein ethyl aziridinyl formate is reacted with dimethyldithiophosphoric acid to produce ethyl-N-(beta-O,O-dimethyldithiophosphorylethyl)carbamate.

6. The process as described in claim 4 wherein n-propyl aziridinyl thiolformate is reacted with diethyldithiophosphoric acid to produce n-propyl-N-(beta-O,O-diethyldithiophosphorylethyl)thiolcarbamate.

7. A process for the prepartion of alkyl N-(beta-dialkyldithiophosphorylethyl)carbamates and thiolcarbamates in which said alkyl groups contain from 1 to 6 carbon atoms, inclusive, comprising the steps: reacting in a mole to mole ratio at a temperature between about −10° C. and about 25° C. a member selected from the group consisting of alkyl chloroformate and alkyl chlorothiolformate with ethylenimine in the presence of sodium hydroxide solution and reacting at a temperature between about −20° C. to about 100° C. in an acidic solution the alkyl aziridinyl formate or alkyl aziridinyl thiolformate therefrom with at least an equimolar amount of a member selected from the group consisting of dialkyldithiophosphoric acid and aqueous solutions of alkali metal and ammonium dialkyldithiophosphates and adjusting the pH to about 7 to about 8 before isolating the material produced thereby.

8. The process as described in claim 7 wherein ethyl chloroformate and ethylenimine are reacted in the presence of a solution of sodium hydroxide and the ethyl aziridinyl formate formed therein is condensed with dimethyldithiophosphoric acid to produce ethyl-N-(beta-O,O-dimethyldithiophosphorylethyl)carbamate.

9. The process as described in claim 7, wherein n-propyl chlorothiolformate and ethylenimine are reacted in the presence of a solution of sodium hydroxide and the n-propyl aziridinyl thiolformate formed therein is condensed with diethyldithiophosphoric acid to produce n - propyl - N - (beta - O,O - diethyldithiophosphorylethyl)thiolcarbamate.

10. The process of opening an alkyl formate or alkyl thiolformate N-substituted ethylenimine ring in which said alkyl group contains from 1 to 6 carbon atoms, inclusive, comprising reacting under acidic conditions said N-substituted ethylenimine ring with at least an equimolar amount of a member selected from the group consisting of dialkyldithiophosphoric acid and aqueous solutions of alkali metal and ammonium dialkyldithiophosphates in which said alkyl groups contain from 1 to 6 carbon atoms, inclusive, at a temperature between about −20° C. to about 100° C. and adjusting the pH to about 7 to about 8 before isolating the material produced thereby.

11. The process as described in claim 10 wherein ethyl aziridinyl formate is reacted with dimethyldithiophosphoric acid to produce ethyl-N-(beta-O,O-dimethyldithiophosphorylethyl)carbamate.

12. The process as described in claim 10 wherein n-propyl aziridinyl thiolformate is reacted with diethyldithiophosphoric acid to produce n-propyl-N-(beta-O,O-diethyldithiophosphorylethyl)thiolcarbamate.

References Cited
UNITED STATES PATENTS 3,318,937   5/1967   Rohr _____ 260—455

CHARLES B. PARKER, *Primary Examiner.*

D. R. PHILLIPS, *Assistant Examiner.*

U.S. Cl. X.R.

260—239, 938, 978